(12) United States Patent
Gobbato et al.

(10) Patent No.: US 11,614,059 B2
(45) Date of Patent: Mar. 28, 2023

(54) MOTOR VEHICLE ENGINE AIR INTAKE SYSTEM, AN AIR FILTER ENCLOSURE ASSEMBLY AND VEHICLE ENGINE AIR INTAKE METHOD

(71) Applicant: BENTLEY MOTORS LIMITED, Crewe (GB)

(72) Inventors: Fabrizio Gobbato, Nantwich (GB); Simon John Maddock, Broomhall (GB)

(73) Assignee: Bentley Motors Limited, Crewe (GB)

( * ) Notice: Subject to any disclaimer, the term of this patent is extended or adjusted under 35 U.S.C. 154(b) by 725 days.

(21) Appl. No.: 16/478,122

(22) PCT Filed: Jan. 5, 2018

(86) PCT No.: PCT/GB2018/050019
§ 371 (c)(1),
(2) Date: Jul. 15, 2019

(87) PCT Pub. No.: WO2018/134559
PCT Pub. Date: Jul. 26, 2018

(65) Prior Publication Data
US 2020/0032747 A1    Jan. 30, 2020

(30) Foreign Application Priority Data
Jan. 17, 2017   (GB) ..................................... 1700799

(51) Int. Cl.
*B01D 46/00* (2022.01)
*F02M 35/04* (2006.01)
(Continued)

(52) U.S. Cl.
CPC ....... *F02M 35/161* (2013.01); *B01D 46/0005* (2013.01); *B01D 46/0012* (2013.01);
(Continued)

(58) Field of Classification Search
CPC ............ B01D 46/0005; B01D 46/0012; B01D 46/10; B01D 2275/205; B01D 2277/20;
(Continued)

(56) References Cited

U.S. PATENT DOCUMENTS

| 2,614,654 | A | * | 10/1952 | Strinden | .............. B60H 3/0616 |
| | | | | | 55/491 |
| 4,932,490 | A | * | 6/1990 | Dewey | ............. F02M 35/10137 |
| | | | | | 55/385.3 |
| 5,086,858 | A | | 2/1992 | Mizuta et al. | |
| 5,141,068 | A | | 8/1992 | Mendicino | |

(Continued)

FOREIGN PATENT DOCUMENTS

| DE | 102008020079 A1 | 10/2009 |
| EP | 0652150 A1 | 5/1995 |

(Continued)

OTHER PUBLICATIONS

Great Britain Patent Application No. 1700799.8; Combined Search and Examination Report; dated Jun. 6, 2017.
Int'l Patent Application No. PCT/GB2018/050019; International Search Report and Written Opinion; dated May 9, 2018.

*Primary Examiner* — Minh Chau T Pham
(74) *Attorney, Agent, or Firm* — Schwabe Williamson & Wyatt, P.C.

(57) ABSTRACT

Vehicle Engine Air Intake System and Method (to be accompanied by FIGS. 1 and 3) In a motor vehicle (12), an air filter housing (14) is at least partially defined by a cross-member (28) forming part of a structural front end module of the vehicle body. The cross-member (28) defines a recess (44) for receiving an air filter (90) and at least one air inlet aperture opening into the recess. An air filter enclosure assembly is mounted to the cross-member over an open face of the recess. The air filter enclosure assembly may include an air filter enclosure (42) and an air filter (90).

18 Claims, 5 Drawing Sheets

(51) Int. Cl.
*F02M 35/024* (2006.01)
*F02M 35/10* (2006.01)
*F02M 35/16* (2006.01)
*B01D 46/10* (2006.01)
*B60K 13/02* (2006.01)
*F02M 35/02* (2006.01)

(52) U.S. Cl.
CPC .............. *B01D 46/10* (2013.01); *B60K 13/02* (2013.01); *F02M 35/0204* (2013.01); *F02M 35/02416* (2013.01); *F02M 35/02491* (2013.01); *F02M 35/048* (2013.01); *F02M 35/10013* (2013.01); *F02M 35/10078* (2013.01); *F02M 35/10137* (2013.01); *F02M 35/10144* (2013.01); *B01D 2275/205* (2013.01); *B01D 2277/20* (2013.01); *B01D 2279/60* (2013.01); *F02M 35/10347* (2013.01)

(58) Field of Classification Search
CPC .............. B60K 13/02; F02M 35/0204; F02M 35/02416; F02M 35/02491; F02M 35/048; F02M 35/10013; F02M 35/10078; F02M 35/10137; F02M 35/10144
USPC ..... 55/385.3, 467, 491, 502; 123/198 E, 585
See application file for complete search history.

(56) References Cited

U.S. PATENT DOCUMENTS

| | | | | |
|---|---|---|---|---|
| 5,251,712 A | * | 10/1993 | Hayashi | B60K 13/02 55/385.3 |
| 6,640,794 B2 | * | 11/2003 | Weber | F02M 35/161 123/585 |
| 7,290,630 B2 | | 11/2007 | Maeda et al. | |
| 7,802,651 B2 | * | 9/2010 | Park | F02M 35/14 55/502 |
| 8,137,425 B2 | * | 3/2012 | Saito | F02M 35/02 55/420 |
| 8,430,450 B2 | * | 4/2013 | Stephens | B60H 3/0616 55/385.3 |
| 8,940,066 B2 | * | 1/2015 | Richter | B60H 1/00471 55/467 |
| 2004/0050357 A1 | | 3/2004 | Idei et al. | |
| 2012/0211293 A1 | * | 8/2012 | Leanza | F02M 35/161 55/385.3 |
| 2012/0324846 A1 | * | 12/2012 | Marx | F02M 35/088 55/385.3 |
| 2015/0274239 A1 | | 10/2015 | Kontani | |
| 2016/0177889 A1 | * | 6/2016 | Matsubara | F02M 35/10124 55/385.3 |

FOREIGN PATENT DOCUMENTS

FR 2668436 A1 4/1992
GB 2333270 A 7/1999

* cited by examiner

MOTOR VEHICLE ENGINE AIR INTAKE SYSTEM, AN AIR FILTER ENCLOSURE ASSEMBLY AND VEHICLE ENGINE AIR INTAKE METHOD

CROSS-REFERENCE TO RELATED APPLICATION

This application is a 371 U.S. National Stage of International Application No. PCT/GB2018/050019 filed Jan. 5, 2018, entitled "MOTOR VEHICLE HAVING AN ENGINE AIR INTAKE SYSTEM AND AN AIR FILTER ENCLOSURE ASSEMBLY METHOD OF DIRECTING AIR TO A VEHICLE ENGINE AIR INTAKE," which designated, among the various States, the United States of America, and which claims priority to GB 1700799.8, filed Jan. 17, 2017, both of which are hereby incorporated by reference in their entirety.

TECHNICAL FIELD OF THE INVENTION

The present invention relates to an engine air intake system in a motor vehicle, to an air filter enclosure assembly for use in a motor vehicle and to a method of directing air to the air intake of an engine in a motor vehicle.

BACKGROUND TO THE INVENTION

Motor cars and other road vehicles having an internal combustion engine require an air intake system through which air is directed to the air intake of the engine. Known air intake systems comprise a filter to remove particulate matter from the air before it enters the engine. Typically, the filter is removably mounted in a housing, sometimes referred to as an "air box", and the air intake system defines one or more inlet conduits through which air is directed from the environment into an inlet side of the filter housing and one or more outlet conduits for directing air from an outlet side of the filter housing to the engine. Often the air filter housing and the inlet/outlet conduits are moulded plastics components. The size of the air inlet system varies depending on the size of the engine and hence the volume of air which must pass through it.

In motor cars and other similar road vehicles having a body defining an engine compartment, the air intake systems are generally located at least partially within the engine compartment. In modern vehicles, space within the engine compartment is limited. This can lead to packaging issues in accommodating an air intake system and can be a particular problem for premium vehicles that have a greater range of ancillary equipment which need to be accommodated within the engine compartment and large capacity engines requiring a correspondingly large air intake system.

The body of a modern motor vehicle often comprises one or more structural frames for supporting unstressed body panels and other components of the vehicle. A motor vehicle body may have one or more such structural frames, with each frame having a number of structural members linked together. For example, it is known in some motor vehicles for the body to have a structural front end module comprising a number of transverse cross-members extending between a pair of spaced upright structural members in front of the engine compartment. The front end module may also include structural members which extend rearwardly along either side of the engine compartment. Such structural frames, and the structural members they are made of, are designed to meet structural dynamic stiffness requirements taking into account Noise, Vibration and Harshness (NVH) management considerations and are an essential part of the motor vehicle body. However, the need to accommodate structural members surrounding the engine compartment limits the size of the engine compartment.

There is a need for a motor vehicle having an alternative air intake system which overcomes, or at least mitigates, the drawbacks of the known air intake systems.

There is a need in particular for a motor vehicle having an air intake system which takes up less room within an engine compartment of the vehicle.

There is a need also for an air filter enclosure assembly for a motor vehicle which overcomes, or at least mitigates, the drawbacks of the known air filter enclosure assemblies.

There is a further need for an alternative method of directing air to an air intake of a motor vehicle engine which overcomes, or at least mitigates, the drawbacks of the known methods.

SUMMARY OF THE INVENTION

Aspects of the invention relate to an air intake system for a motor vehicle, a motor vehicle, an air filter housing assembly for a vehicle, an air filter enclosure for a vehicle, and to a method of directing air to an air intake of a vehicle engine.

According to a first aspect of the invention, there is provided an air intake system for a vehicle having an engine, the system comprising one or more conduits for directing air towards the engine, wherein at least one conduit is at least partially defined by a surface of a structural component of the vehicle.

The at least one conduit may form at least part of an air filter housing assembly.

In an embodiment, the structural component comprises a cross-member forming part of a structural front end module of a vehicle body. In which case, the front end module may comprise a pair of upright members spaced apart, the cross-member being connected between the upright members. In an embodiment, the front end module comprises a plurality of cross-members connected between the upright members, the structural component being an uppermost one of the cross-members.

In an embodiment, the structural member defines a recess for at least partially receiving an air filter. The recess may be defined in the structural member between a base and one or more peripheral walls, at least part of the peripheral walls being upwardly divergent. The structural member may define at least one air inlet aperture opening into the recess. An outwardly extending flange may extend about a periphery of the, or each, air inlet aperture.

In an embodiment, the air intake system has an air filter enclosure mounted to the structural member over an open face of the recess. At least one of the structural member and the air filter enclosure may define at least one air outlet. In an embodiment, the air filter enclosure defines said at least one outlet. An air flow path may be defined from the at least one inlet to the at least one outlet, the air intake system including an air filter located in the air flow path. The air intake system may comprise an air conduit for directing air from the at least one air outlet to an engine of a vehicle in which the system is mounted in use.

In an embodiment, the air filter enclosure is part of an assembly which includes an air filter mounted to the air filter enclosure. The air filter enclosure may comprise a mounting frame releasably mounted to the structural member, an air filter cover releasably attached to the mounting frame, the air filter having a mounting formation sandwiched between the mounting frame and the air filter cover.

The air intake system may comprise an air conduit for directing ambient air into the at least one air inlet.

The structural component may be made of metal and/or a composite material.

According to a second aspect of the invention, there is provided a motor vehicle having a body defining an engine compartment, an engine at least partly located within the engine compartment and an air intake system for the engine, the air intake system comprising one or more conduits for directing air towards the engine, wherein at least one said conduit is an air filter housing at least partially defined by a cross-member forming part of a structural front end module of the body of the motor vehicle, the cross-member defining a recess for at least partially receiving an air filter and at least one air inlet aperture opening into the recess, the air intake system including an air filter enclosure mounted to the cross-member over an open face of the recess.

Using a structural component of a motor vehicle to define part of an engine air intake system reduces the amount of space required within the engine compartment to house the air intake system. It also reduces the amount of material used to form the air intake system and hence the overall weight of the vehicle.

The vehicle may be a motor car.

In an embodiment, the front end module comprises a plurality of cross-members connected between the upright members, the air filter housing being at least partially defined in an uppermost one of the cross-members.

The recess may be defined in the cross-member between a base and one or more peripheral walls, at least part of the peripheral walls being upwardly divergent. An outwardly extending flange may extend about a periphery of the, or each, air inlet aperture.

At least one of the cross-member and the air filter enclosure may define at least one air outlet. In an embodiment, the air filter enclosure defines said at least one air outlet. An air flow path may be defined from the at least one air inlet to the at least one air outlet, the air intake system including an air filter located in the air flow path. The air intake system may comprise an air conduit for directing air from the at least one air outlet to the engine.

In an embodiment, the air filter enclosure is part of an assembly which includes an air filter mounted to the air filter enclosure. The air filter enclosure may comprise a mounting frame releasably mounted to the cross-member, an air filter cover releasably attached to the mounting frame, the air filter having a mounting formation sandwiched between the mounting frame and the air filter cover.

The air intake system may comprise an air conduit for directing ambient air into the at least one air inlet.

The cross-member may be made of metal and/or a composite material.

In accordance with a third aspect of the invention, there is provided a motor vehicle having a body defining an engine compartment, an engine at least partly located within the engine compartment, and an air filter housing assembly, the air filter housing assembly comprising a housing defined in part by recess in a cross-member forming part of a structural front end module of the vehicle body and in part by an air filter enclosure connected to the structural component to close an open face of the recess, the air filter housing assembly also comprising an air filter at least partially located within the recess.

The vehicle may be a motor car.

In an embodiment, the cross-member comprises an air inlet and at least one of the cross-member and the air filter enclosure defines at least one air outlet, an air flow path defined from the inlet to the outlet through the air filter. In an embodiment, the air filter enclosure defines said at least one air outlet.

In an embodiment, the air filter enclosure is part of an assembly comprising an air filter releasably mounted to the enclosure. The air filter enclosure may comprise a mounting frame releasably mounted to the cross-member and an air filter cover releasably attached to the mounting frame, the air filter having a mounting formation sandwiched between the mounting frame and the air filter cover.

In accordance with a fourth aspect of the invention, there is provided an air filter enclosure assembly for use in a motor vehicle according to either of the second and third aspects of the invention.

In an embodiment, the air filter enclosure comprises a mounting frame and an air filter cover releasably attached to the mounting frame, the air filter having a mounting formation sandwiched between the mounting frame and the air filter cover.

In accordance with a fifth aspect of the invention, there is provided a method of directing air to an air intake of an engine in a motor vehicle, the method comprising directing a flow of air through an air filter housing at least partially defined by a cross-member forming part of a structural front end module of a body of the motor vehicle.

The surface of the cross-member may be shaped so as to maintain/encourage laminar flow of air through the air filter housing.

The motor vehicle may be a motor car.

DETAILED DESCRIPTION OF THE INVENTION

In order that the invention may be more clearly understood, an embodiment thereof will now be described, by way of example only, with reference to the accompanying drawings, of which:

An embodiment of an air intake system 10 for a motor vehicle 12 in accordance with an aspect of the present invention is illustrated in the accompanying drawings. The air intake system includes an air filter housing assembly 14 which has an air filter housing partly defined by means of a structural component of the vehicle.

Figure 1:
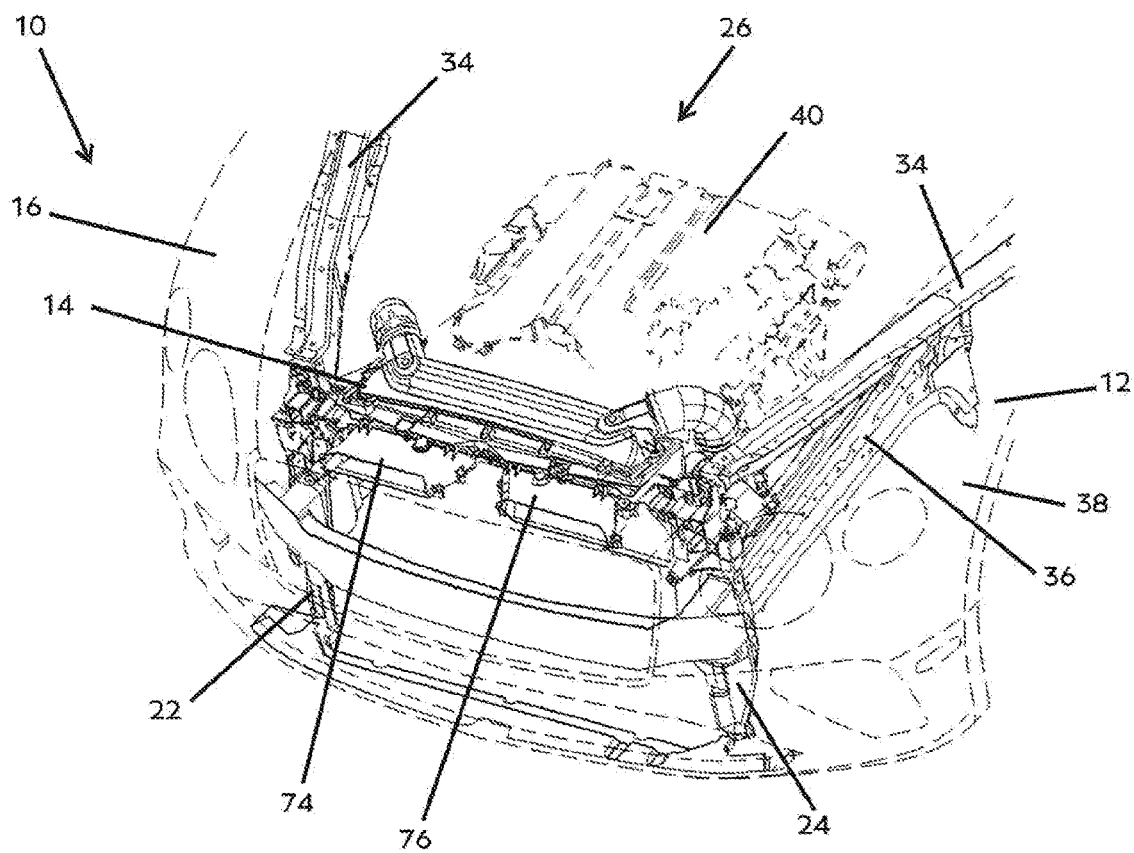
FIG. 1 is a schematic perspective view of a front end region of a motor vehicle in the form of a motor car, in which body panels of the vehicle are ghosted to show internal detail including an embodiment of an air intake system in accordance with an aspect of the invention.
Figure 2:
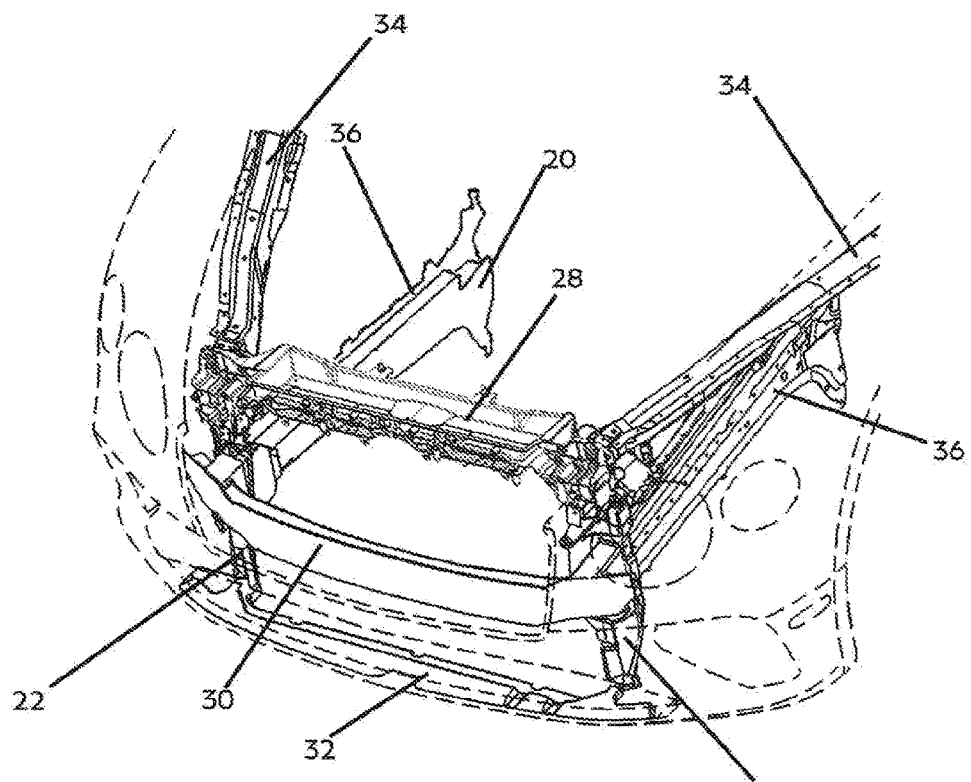
FIG. 2 is a view similar to that of FIG. 1 but with certain components of the air intake system omitted.
Figure 3:
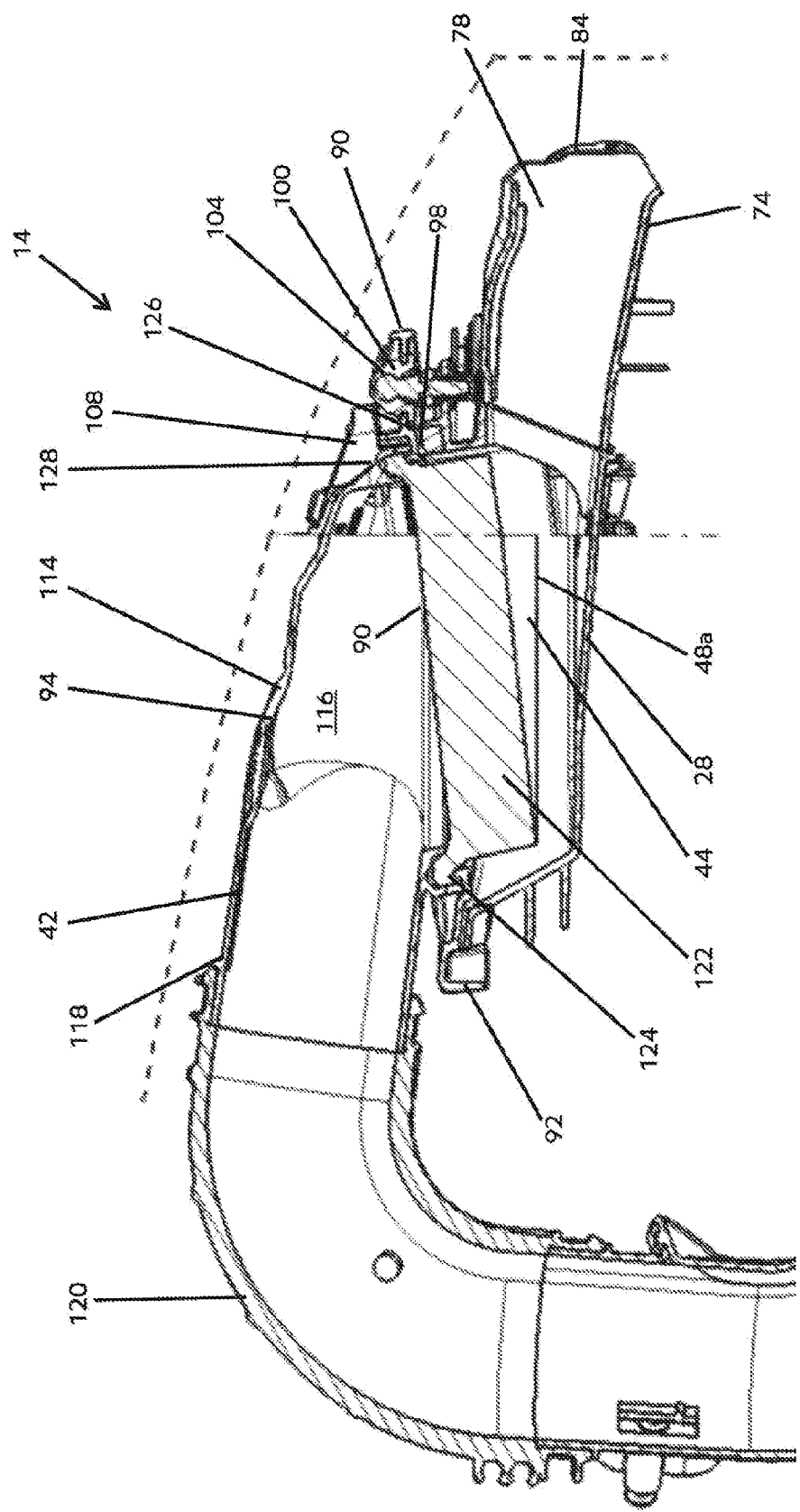
FIG. 3 is a cross sectional view through part of the air intake system shown in FIG. 1, the view being taken along a central longitudinal axis of the vehicle.

As illustrated in FIGS. 1 and 2, the motor vehicle 12 has a body 16 with a structural front end module (FEM) 20 comprising a number of structural components connected together in the form of a frame. The FEM 20 has a pair of upright structural frame members 22, 24 spaced apart at either side in front of an engine compartment 26 of the vehicle. The upright frame members 22, 24 are interconnected by three cross-members 28, 30, 32, which extend transversely in front of the engine compartment 26. The FEM 20 also includes longitudinal frame members 34, 36 which extend rearwardly from each upright member 22, 24 along respective sides of the engine compartment 26. The FEM 20 is supplied as a single complete component which is assembled into the body and is part of the load bearing structure of the vehicle body. The FEM 20 is designed to provide the front end of the vehicle with a required level of structural dynamic stiffness and supports non-stressed body panels 38 and other components of the vehicle. The structural members in the FEM 20 can be made of any suitable materials including, but not limited to, metallic materials such as steel, aluminium and magnesium alloys, and composite materials.

Located within the engine compartment 26 is an internal combustion engine 40, which in this case is a V-type engine having two banks of pistons and cylinders, each requiring a supply of air from the air intake system 10.

Figure 4:
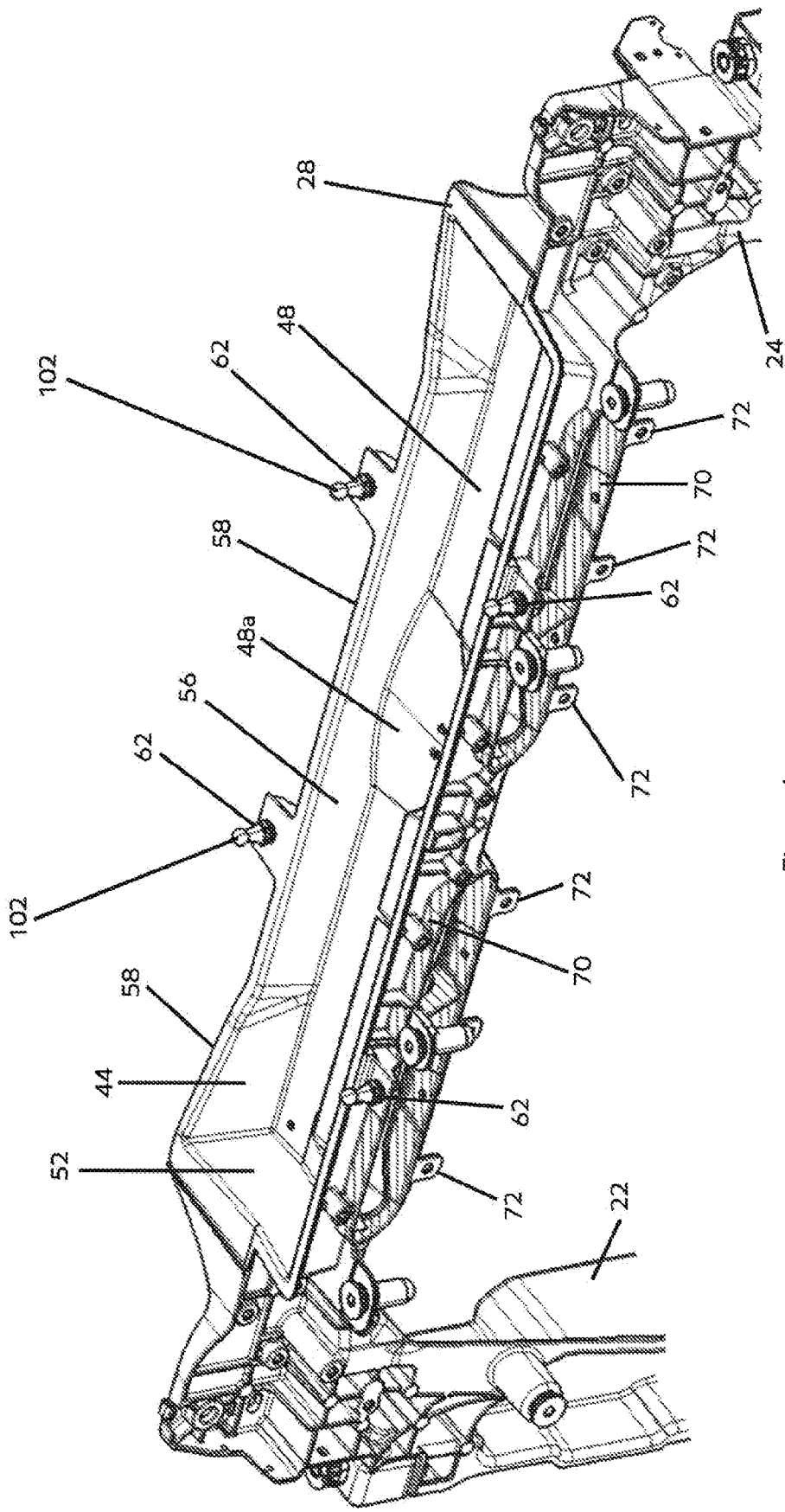
FIG. 4 is a perspective view from the front of a structural member forming part of the air intake system shown in FIG. 1.
Figure 5:
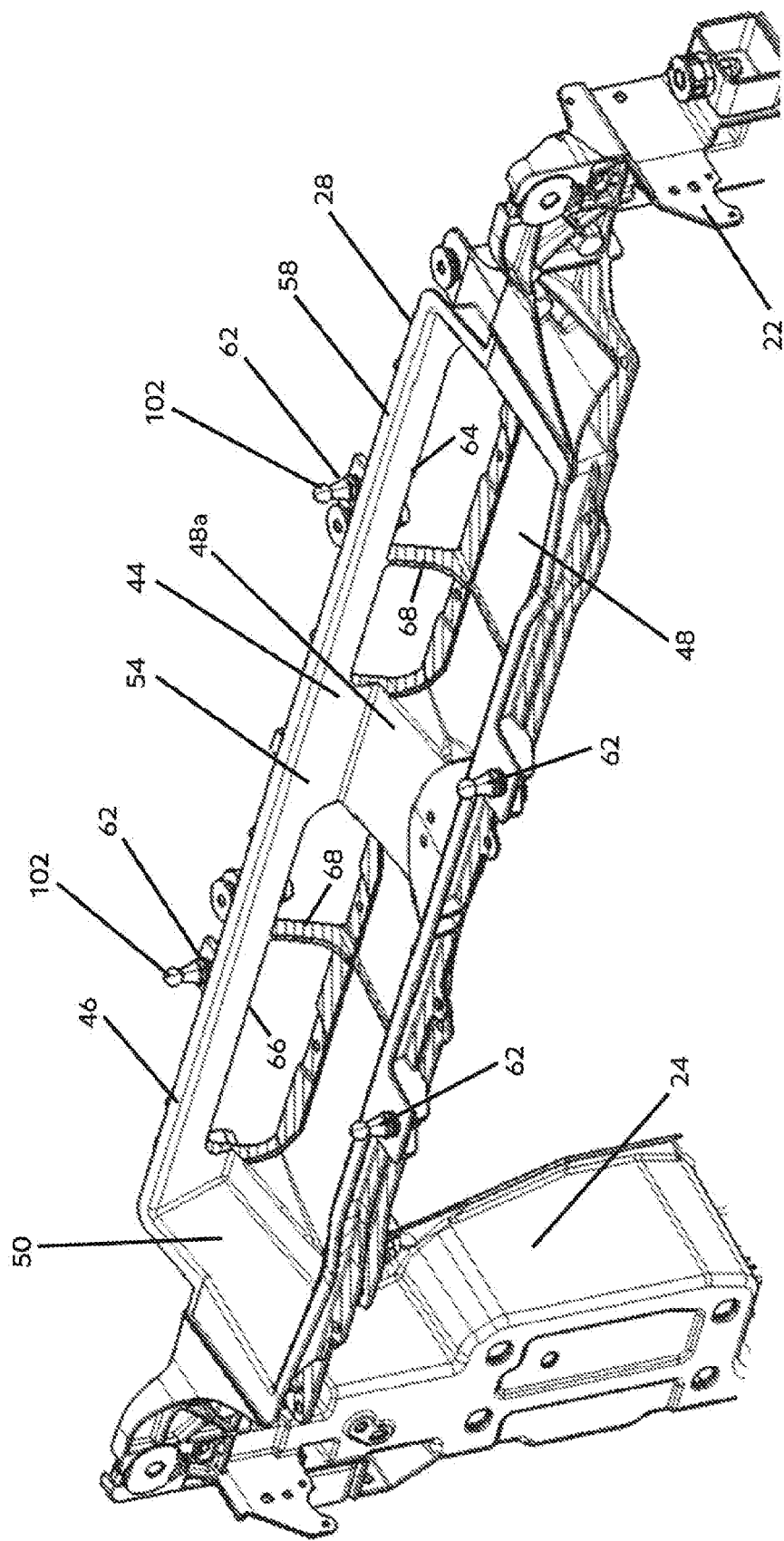
FIG. 5 is a perspective view from the rear of the structural member of FIG. 4.

The air filter housing is partly defined by the uppermost cross-member 28 of the FEM 20 and partly by an air filter enclosure 42 which is mounted to the cross-member 28. As can be seem most clearly in FIGS. 4 and 5, the cross-member 28 includes a central region formed generally as a hollow box section beam but which instead of being fully enclosed is open at the top such that it defines an elongate, generally rectangular recess 44 having an open upper face 46. The recess 44 is defined between a base 48 and peripheral walls 50, 52, 54, 56 which extend upwardly from the base 48. The peripheral walls included opposed end walls 50, 52, a front wall 54 and a rear wall 56. At least the front and rear walls 54, 56 are upwardly divergent such that the recess is wider at the top than the bottom. The base 48 includes a convex central portion 48a which is shaped to provide a recess under the cross-member for routing cables and the like. A horizontal flange 58 extends outwardly about the upper ends of the peripheral walls 50, 52, 54, 56 to define an abutment surface for mounting an air filter enclosure 42 to the cross-member. Four mounting posts 62 to which the air filter enclosure 42 is mounted project upwardly from tabs spaced about the flange 58. Two mounting posts 62 are spaced apart along the rear wall and two spaced apart along the front wall.

Figure 6:
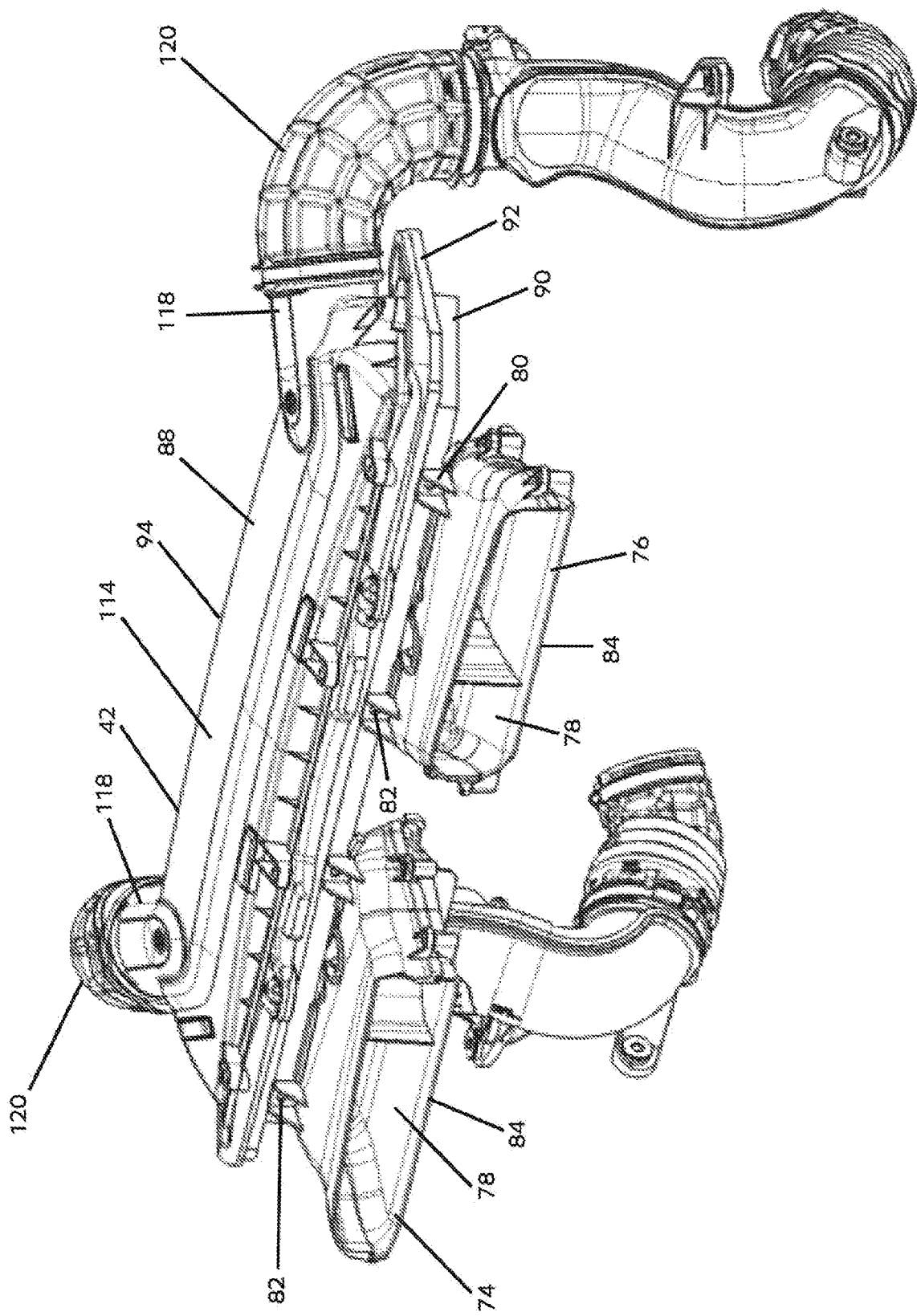
FIG. 6 is a perspective view illustrating inlet ducts and an air filter enclosure assembly forming part of the air intake system shown in FIG. 1.

Two air inlet apertures 64, 66 extend through the front wall 54, one on either side of the convex central portion 48a of the base. Each air inlet aperture is elongate, extending over of the majority of the area of the front wall between the convex central portion 48a and the respective end wall 50, 52. On either side of the convex central portion 48a, a region of the base 48 slopes downwardly towards the lower edge of the respective air inlet aperture 64, 66. The inlet apertures 64, 66 are curved at the ends and each is divided into two unequal parts by means of an upwardly extending rib or stanchion 68 which helps to maintain the structural rigidity of the cross-member. In alternative embodiments, the parts may be equal and/or the inlet aperture may be divided into more than two parts or undivided. A forwardly projecting flange 70 extends about the periphery of each inlet aperture 64, 66 on the outer, forward face of the front wall 54. The flanges 70 also help to maintain the structural rigidity of the cross-member, compensating to some extent for the loss of rigidity resulting from the reduction in material in the cross member in forming the inlet apertures. A number of threaded lugs 72 are located about the outside of each flange 70 for mounting inlet conduits 74, 76. As illustrated in FIG. 6, each inlet conduit 74, 76 is in the form of tube having an inner passage 78 which broadly corresponds in shape and cross sectional area to that of its respective inlet aperture 64, 66. Each inlet conduit has mounting lugs 80 which co-operate with the lugs 72 on the cross-member. Releasable fastenings (not shown) are inserted through apertures 82 in the mounting lugs 80 to engage with the threaded lugs 72 on the cross-member to releasably mount the inlet conduits 74, 76 to the cross-member. A seal may be located between each inlet conduit and the cross-member. The inlet conduits 74, 76 extend forwardly of the cross-member and have open forward ends 84 through which ambient air enters the conduits 74, 76 to be directed into the recess 44 in the cross-member through the respective inlet aperture 64, 66. The forward ends 84 of the inlet conduits may be arranged to be located proximal a rear face of a radiator of the vehicle. A panel may be located between the forward ends 84 of the inlet conduits 74, 76 and the radiator to prevent debris, such as water, ice, dirt and the like, travelling straight into the inlet conducts 74, 76.

The air filter enclosure 42 is part of an assembly which includes an air filter 90 mounted to the enclosure 42. The air filter enclosure 42 includes a mounting frame 92 and an air filter cover 94. The mounting frame 92 is mounted to and generally conforms in shape to the flange 58 at the upper surface of the cross-member 28. A seal 98 is located between the flange 58 and the mounting frame 92 to form an airtight seal between the two. The seal 98 may be attached to the cross-member 28 or to the mounting frame 92. Four resilient mounting sockets 100 are located in the mounting frame, into each of which a respective mounting post 62 is inserted to releasably attach the mounting frame, and hence the air filter enclosure assembly 88, to the cross-member 28. The mounting posts 62 each have a part-spherical head 102 and each mounting socket defines a matching part-spherical cavity 104 into which a head 102 of a respective mounting post can be pressed with a snap-fit to retain the air filter assembly in position on the cross-member. The shapes of the head 102 and socket cavity 104 are complimentary to allow for a snap-fit but need not be part-spherical in alternative embodiments.

The air filter cover 94 is releasably mountable to the mounting frame 92 and secured thereto by suitable fixings (not shown). The cover 94 has a lower peripheral frame-like region 108 having a lower surface which locates on an upper surface of the mounting frame 92 when the two are assembled together. A seal may be provided between the mounting frame 92 and the air filter cover 94 to provide an air tight seal between them. The cover 94 has a cover portion 114 which extends across the lower peripheral region 108 defining an internal cavity 116. The cover portion 114 also defines a pair of air filter housing air outlets 118, one on either side, through which air can flow from the internal cavity 116. Each air filter housing outlet 118 is connected with an air intake on a respective bank of the engine by means of a flexible conduit 120. The conduits 120 may be formed integrally with the cover 94 or they may be separate components releasably mountable to the cover 94.

The air filter 90 has a main filter body 122 comprising filtration material and which in this embodiment generally has the shape of a rectangular cuboid. One or more mounting formations 124 project upwardly and outwardly along at least the front and rear upper edges of the main body. The mounting formations 124 on the air filter are sandwiched between corresponding formations 126, 128 on the mounting frame 92 and the air filter cover 94 to secure the air filter in place. The air filter 90 may be a single component which extends over substantially the entire length of the air filter housing or it may be made up of two or more separate lengths. In an embodiment, the air filter 90 is provided in two parts, one part located within the recess 44 on either side of the central convex part 48a of the base 48 for filtering air passing from the air inlet aperture 64, 66 to the air outlet 118 on that side of the vehicle.

The inlet conduits 74, 76, the mounting frame 92, the air filter cover 94, and the flexible conduits 120 can be made from any suitable materials but in an embodiment are made from polymeric materials. They may be moulded plastic components.

In order to mount the air filter enclosure assembly 88 to the cross-member 28, the air filter cover 94 is attached to the mounting frame 92 with the air filter 90 in position so as to clamp the mounting formations 124 on the air filter between the respective formations 126, 128 on the mounting frame 92 and the cover 94. The air filter enclosure assembly 88 can then be mounted as a single unit to the cross-member 28 by inserting the heads 102 of the mounting posts 62 into the mounting sockets 100, with at least part of the main body 122 of the air filter 90 being received in the recess 44 defined in the cross-member 28. The conduits 120 can then be connected to air intakes on their respective bank of the engine 40.

When the air filter enclosure assembly 88 is mounted to the cross-member 28, the enclosure 42 and cross-member combine to define an air filter housing which is fully sealed, except for the air inlets 64, 66 in the cross-member and the air outlets 118. Air is constrained to flow along a flow path from the inlets 64, 66 to the outlets 118 through the air filter 90. Suitable sealing arrangements are provided about the periphery of the air filter main body 122 to prevent air flowing from the inlets 64, 66 to the outlets 11 without passing through the filtration material. Where the air filter 90 is in two or more parts, further sealing arrangements are provided between adjacent air filter parts to prevent air flow by passing the filtration material.

By using the cross-member 28 to at least partially define the air filter housing, the air intake system uses less space within the engine compartment 26 itself and there is a saving in materials used and hence weight. By suitable design, the cross-member 28 can be adapted to form part of the air intake system whilst still meeting the structural dynamic stiffness requirements of the FEM 20. Where some structural rigidity is lost in the cross-member 28, this can be compensated for by increasing the remaining body front end stiffness.

The air intakes 74, 76 are designed to manage the air flow to encourage a laminar flow and the interior surfaces of the recess 44 in the cross-member 28 are shaped so as to maintain and further encourage laminar flow. For example, a smooth transition between the cross member/air filter housing and the inlet and outlet ducts allows an undisturbed air flow through the intake system.

The above embodiment is described by way of example only. Many variations are possible without departing from the scope of the invention as defined in the appended claims. For example, the shape of the recess 44 may be varied with a corresponding change in the shape of the mounting fame 92, the air filter cover 94, and the air filter 90. Where the engine 40 has only a single air inlet, the air filter enclosure assembly may have only a single air outlet 118. Furthermore, whilst the air outlets 118 are defined by the air filter cover 94 in the present embodiment, any required air outlets could be defined in the cross-member 28 in other embodiments, with suitable positioning of the air filter so that a flow path is defined from the inlet(s) to the outlet(s) through the air filter. Whilst it is convenient to mount the air filter 90 to the air filter enclosure 42 to form an assembly which can be mounted as a unit to the cross-member 28, the air filter 90 could be separate from the air filter enclosure and mounted within the recess by other arrangements.

The invention has been described in relation to a motor vehicle 12 in the form of a motor car. The term "motor car" as used herein should be understood as encompassing motor vehicles intended primarily, but not exclusively, for use on roads and which have three, four or more wheels. The term "motor car" as used herein encompasses a broad range of passenger vehicles including city cars, saloon (sedan) cars, estate cars (station wagons), pickup trucks, MPVs, SUVs and the like. However, whilst the invention has been described in relation to a motor car, it can be adapted for use in other similar road vehicles having a body which defines an engine compartment within which an engine of the vehicle is at least partly located such as: vans, trucks, lorries, mini-buses, buses and the like.

The invention claimed is:

1. A motor vehicle having a body defining an engine compartment, an engine at least partly located within the engine compartment and an air intake system for the engine, the air intake system comprising one or more conduits for directing air towards the engine, wherein at least one said conduit is an air filter housing at least partially defined by a cross-member forming part of a structural front end module of the body of the motor vehicle, the cross-member defining a recess for at least partially receiving an air filter and at least one air inlet aperture opening into the recess, the air intake system including an air filter enclosure releasably mounted to the cross-member over an open face of the recess, wherein one of the cross-member and the air filter enclosure defines at least one air outlet and wherein an air flow path is defined from the at least one air inlet aperture to the at least one air outlet, the air intake system including an air filter located in the air flow path between the at least one inlet aperture and the outlet.

2. A motor vehicle as claimed in claim 1, wherein the air filter enclosure defines said at least one air outlet.

3. A motor vehicle as claimed in claim 1, wherein the air filter enclosure is part of an assembly which includes the air filter mounted to the air filter enclosure.

4. A motor vehicle as claimed in claim 3, the air filter enclosure having a mounting frame releasably mounted to the cross-member and an air filter cover releasably mounted to the mounting frame, the air filter having a mounting formation sandwiched between the mounting frame and the air filter cover.

5. A motor vehicle as claimed in claim 1, the air intake system comprising an air conduit for directing air from the at least one air outlet aperture to the engine.

6. A motor vehicle as claimed in claim 1, the air intake system comprising an air conduit for directing ambient air into the at least one air inlet aperture.

7. A motor vehicle as claimed in claim 1, wherein an outwardly extending flange extends about a periphery of the, or each, air inlet aperture.

8. A motor vehicle as claimed in claim 1, wherein the recess is defined in the cross-member between a base and one or more peripheral walls, at least part of the peripheral walls being upwardly divergent.

9. A motor vehicle as claimed in claim 1, wherein the front end module comprises a pair of upright members spaced apart, the cross-member being connected between the upright members.

10. A motor vehicle as claimed in claim 9, wherein the front end module comprises a plurality of cross-members connected between the upright members, the air filter housing being at least partially defined by an uppermost one of the cross-members.

11. A motor vehicle having a body defining an engine compartment, an engine at least partly located within the engine compartment, and an air filter housing assembly forming part of an air intake system for the engine, the air filter housing assembly comprising a housing defined in part by recess in a cross-member forming part of a structural front end module of the vehicle body and in part by an air filter enclosure releasably connected to the structural component to close an open face of the recess, wherein the cross-member comprises an air inlet and at least one of the cross-member and the air filter enclosure defines at least one air outlet, an air flow path being defined from the air inlet to the air outlet through the air filter, the air filter housing assembly also comprising an air filter at least partially located within the recess in the air flow path between the at least one air inlet and the at least one air outlet.

12. A motor vehicle as claimed in claim 11, wherein the air filter enclosure defines said at least one air outlet.

13. A motor vehicle as claimed in claim 11, wherein the air filter enclosure is part of a unit comprising the air filter releasably mounted to the air filter enclosure.

14. A motor vehicle as claimed in claim 13, wherein the air filter enclosure comprises a mounting frame releasably mounted to the cross-member and an air filter cover releasably mounted to the mounting frame, the air filter having a mounting formation sandwiched between the mounting frame and the air filter cover.

15. An air filter enclosure assembly for use in a motor vehicle as claimed in claim 13, the air filter enclosure assembly comprising an air filter enclosure for mounting to a cross-member forming part of a structural front end module of a body of a motor vehicle and an air filter releasably mounted to the air filter enclosure.

16. An air filter enclosure assembly as claimed in claim 15, wherein the air filter enclosure comprises a mounting frame and an air filter cover releasably mounted to the mounting frame, the air filter having a mounting formation sandwiched between the mounting frame and the air filter cover.

17. A method of directing air to an air intake of an engine in a motor vehicle, the method comprising directing a flow of air through an air filter housing at least partially defined by a cross-member forming part of a structural front end module of a body of the motor vehicle, wherein the cross-member defines a recess and at least one air inlet aperture opening into the recess, an air filter enclosure assembly being releasable mounted to the cross-member, the air filter enclosure assembly comprising an air filter enclosure and an air filter releasably mounted to the air filter enclosure and at least partially received in the recess, at least one of the cross-member and the air filter enclosure defining at least one air outlet, the method comprising passing air along a flow path from the at least one air inlet aperture to the at least one air outlet through the recess and the air filter.

18. A method as claimed in claim 17, wherein the surface of the cross-member is shaped so as to maintain/encourage laminar flow of air through the air filter housing.

* * * * *